(12) United States Patent
Waki et al.

(10) Patent No.: US 9,059,480 B2
(45) Date of Patent: *Jun. 16, 2015

(54) PROCESS FOR PRODUCTION HEXAFLUOROPHOSPHATES (75) Inventors: Masahide Waki, Izumiotsu (JP); Tatsuhiro Yabune, Izumiotsu (JP); Kazuhiro Miyamoto, Izumiotsu (JP); Kazutaka Hirano, Izumiotsu (JP)

(73) Assignee: STELLA CHEMIFA CORPORATION, Osaka-Shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/993,175

(22) PCT Filed: Aug. 4, 2009

(86) PCT No.: PCT/JP2009/063778
§ 371 (c)(1),
(2), (4) Date: Nov. 17, 2010

(87) PCT Pub. No.: WO2010/016472
PCT Pub. Date: Feb. 11, 2010

(65) Prior Publication Data
US 2011/0097626 A1 Apr. 28, 2011

(30) Foreign Application Priority Data
Aug. 8, 2008 (JP) ................. 2008-205986

(51) Int. Cl.
C01B 25/10 (2006.01)
H01M 10/0568 (2010.01)
(Continued)

(52) U.S. Cl.
CPC ......... *H01M 10/0568* (2013.01); *C01B 25/455* (2013.01); *C01D 13/00* (2013.01); *C01D 15/005* (2013.01); *H01M 10/0525* (2013.01); *Y02T 10/7011* (2013.01)

(58) Field of Classification Search
USPC ........................................................ 429/199
See application file for complete search history.

(56) References Cited

U.S. PATENT DOCUMENTS 2,488,298 A 11/1949 Lange et al.
2,488,299 A 11/1949 Lange
(Continued)

FOREIGN PATENT DOCUMENTS

CN 1171368 A 1/1998
CN 1317445 A 10/2001
(Continued)

OTHER PUBLICATIONS

English Translation of JP2006-302590A to Oe et al.*
(Continued)

*Primary Examiner* — Patrick Ryan
*Assistant Examiner* — Lucas J O'Donnell
(74) *Attorney, Agent, or Firm* — Knobbe Martens Olson & Bear LLP (57) ABSTRACT

An object is to provide a method of manufacturing a hexafluorophosphate, that can simply and easily manufacture an inexpensive and high-quality hexafluorophosphate while suppressing the manufacturing cost, an electrolytic solution containing a hexafluorophosphate, and an electricity storage device including the electrolytic solution. The present invention relates to a method of manufacturing a hexafluorophosphate, which comprises reacting at least a phosphorus compound with a fluoride represented by $MF_s \cdot r(HF)$ (wherein $0 \le r \le 6$, $1 \le s \le 3$, and M is at least one kind selected from the group consisting of Li, Na, K, Rb, Cs, $NH_4$, Ag, Mg, Ca, Ba, Zn, Cu, Pb, Al and Fe) to produce a hexafluorophosphate represented by the chemical formula $M(PF_6)_s$.

9 Claims, 1 Drawing Sheet (51) Int. Cl.
*C01B 25/455* (2006.01)
*C01D 13/00* (2006.01)
*C01D 15/00* (2006.01)
*H01M 10/0525* (2010.01)

(56) References Cited

U.S. PATENT DOCUMENTS

| | | | |
|---|---|---|---|
| 3,401,013 A | | 9/1968 | Rohlfs et al. |
| 5,378,445 A | * | 1/1995 | Salmon et al. ............... 423/301 |
| 5,935,541 A | | 8/1999 | Bonnet et al. |
| 6,322,764 B1 | | 11/2001 | Smith et al. |
| 6,540,969 B1 | | 4/2003 | Smith et al. |
| 6,955,795 B2 | | 10/2005 | Kikuyama et al. |
| 8,097,360 B2 | | 1/2012 | Oe et al. |
| 8,383,075 B2 | * | 2/2013 | Waki et al. ............... 423/301 |
| 2001/0041158 A1 | | 11/2001 | Smith et al. |
| 2006/0040180 A1 | * | 2/2006 | Ivanov et al. ............... 429/188 |
| 2009/0081559 A1 | * | 3/2009 | Oe et al. ............... 429/342 |

FOREIGN PATENT DOCUMENTS

| | | |
|---|---|---|
| CN | 101142703 A | 3/2008 |
| JP | 50-13760 | 5/1975 |
| JP | 63-45108 A | 2/1988 |
| JP | 64-72901 A | 3/1989 |
| JP | 04-175216 A | 6/1992 |
| JP | 5-279003 A | 10/1993 |
| JP | 6-56413 A | 3/1994 |
| JP | 09-165210 A | 6/1997 |
| JP | 9-506329 | 6/1997 |
| JP | 10-081505 | 3/1998 |
| JP | 10-316410 A | 12/1998 |
| JP | 2001-122603 A | 5/2001 |
| JP | 2001-122605 A | 5/2001 |
| JP | 2004-75413 A | 3/2004 |
| JP | 2005-507849 A | 3/2005 |
| JP | 2006-302590 A | 11/2006 |
| WO | WO 03/040034 A1 | 5/2003 |
| WO | WO 2006115025 A1 * | 11/2006 |
| WO | WO 2008096723 A1 * | 8/2008 |

OTHER PUBLICATIONS

Willy Lange, Flourine Chemistry vol. 1 (1950), pp. 164 to 167.
Written Opinion issued in Singapore patent application No. 2009052440 on Jul. 22, 2010.
Supplementary European Search Report for Application No. EP 09804955, completed on Feb. 24, 2012.
Taiwan Office Action dated Nov. 21, 2013 of corresponding Taiwan Patent Application No. 1022159712001.
Office Action issued Feb. 26, 2014 in related Korean Patent Application No. 10-2009-7018708.
Office Action dated Apr. 7, 2013 in corresponding Chinese Application No. 200980129596.2.
Simmons J H, Fluorine Chemistry, 1950, 1: 154-165.
Office Action issued Jun. 11, 2013 in corresponding Japanese Patent Application No. 2008-205986.

* cited by examiner

PROCESS FOR PRODUCTION HEXAFLUOROPHOSPHATES

CROSS-REFERENCE TO RELATED APPLICATIONS

This application is the U.S. National Phase under 35. U.S.C. §371 of International Application PCT/JP2009/063778, filed Aug. 4, 2009, which claims priority to Japanese Patent Application No. 2008-205986, filed Aug. 8, 2008. The International Application was published under PCT Article 21(2) in a language other than English.

TECHNICAL FIELD

The present invention relates to a method of manufacturing a hexafluorophosphate and a manufacturing apparatus thereof, and more particularly to a method of manufacturing a hexafluorophosphate that can be applied to an electrolytic solution of an electricity storage device, an electrolytic solution containing a hexafluorophosphate, and an electricity storage device including the electrolytic solution.

BACKGROUND ART

In a hybrid car and an electric car that are expected as a last resort for reducing $CO_2$ emission, a lithium ion secondary battery is regarded as a key device. As an electrolyte of the lithium ion secondary battery, lithium hexafluorophosphate having high safety and excellent electrical characteristics is exemplified. A hexafluorophosphate including lithium hexafluorophosphate is manufactured by using phosphorus pentafluoride "$PF_5$" as a starting raw material. Phosphorus pentafluoride is a substance that is used as a fluorinating agent of various chemical reactions in the chemical industry and is gaseous at room temperature.

On the other hand, silver hexafluorophosphate "$AgPF_6$" or potassium hexafluorophosphate "$KPF_6$" as a kind of hexafluorophosphates has been attracting special interest as a counter ion that generates an acid necessary for an initiation and growth reaction in photopolymerization. Also, ammonium hexafluorophosphate "$NH_4PF_6$" is useful as a raw material that is used in the manufacture of a pharmaceutical intermediate. Furthermore, quaternary ammonium salts such as triethylmethylammonium hexafluorophosphate and tetraethylammonium hexafluorophosphate are useful as electrolytes for an electric double layer capacitor that is expected as a high power electricity storage device.

As described above, the hexafluorophosphate is used as an indispensable substance depending on functions required in various fields, and $PF_5$ is a very important substance as a raw material in the manufacture of the hexafluorophosphate. However, when the hexafluorophosphate is manufactured by using $PF_5$, there is a common problem about the manufacturing cost of $PF_5$. Particularly, high purity $PF_5$ used in the manufacture of a high quality hexafluorophosphate that can be used as an electrolyte of a lithium ion secondary battery or the like is remarkably expensive.

The method of manufacturing a hexafluorophosphate is described in various documents as exemplified below.

For example, Non-Patent Document 1 describes that $LiPF_6$ is manufactured by dissolving lithium chloride in HF and adding phosphorus pentachloride thereto. Also, Patent Document 1 describes that a hexafluorophosphate is manufactured by reacting phosphorus pentachloride with a HF gas at the temperature within a range from 60 to 165° C. and adding the resultant $PF_5$ to an anhydrous HF solution of an alkali metal fluoride.

However, in the manufacturing methods disclosed in Non-Patent Document 1 and Patent Document 1, since phosphorus pentachloride is a solid having high hygroscopicity and is inferior in workability, there are problems that handling properties are poor when raw materials are charged in the manufacturing facilities, and that it is difficult to attempt mechanization. Also, when phosphorus halides typified by phosphorus pentachloride are used as raw materials, a large amount of hydrogen halide is produced as by-products, thus requiring long and large-size facilities for disposal of an exhaust gas. Furthermore, moisture contained in phosphorus pentachloride is mixed into the reaction system and a portion of the resultant $PF_5$ reacts with the moisture to form phosphorus oxyfluoride such as $POF_3$ or $PO_2F$ as a by-product. As a result, when the hexafluorophosphate is $LiPF_6$, oxyfluorophosphoric acid compounds such as $LiPOF_4$ and $LiPO_2F_2$ are produced and contaminate products, resulting in deterioration of productivity of $LiPF_6$. Also, when $LiPF_6$ manufactured by the method is used as an electrolyte of a lithium battery, there arises a problem that the oxyfluorophosphoric acid compounds cause deterioration of characteristics of the battery.

In order to alleviate the problems described above, for example, Patent Document 2 discloses the following manufacturing method. First, $PF_5$ is produced by reacting phosphorus pentachloride with anhydrous HF. Next, phosphorus oxyfluoride is separated by cooling a mixed gas of $PF_5$ and hydrogen chloride to the temperature that is the boiling point of phosphorus oxyfluoride or lower and the boiling point of $PF_5$ or higher, for example, −40° C. to −84° C., followed by the reaction with lithium fluoride dissolved in anhydrous HF. According to this method, a small amount of phosphorus oxyfluoride is separated from the mixed gas of large excess hydrogen chloride and $PF_5$. However, phosphorus oxyfluoride cannot be completely separated and it is very hard to perform the separation operation. Since the boiling point and the solidifying point of $POF_3$ as phosphorus oxyfluoride are close to each other, there are problems such as the possibility of occlusion of the collector. Therefore, this manufacturing method is not suited for industrial applications.

The above-described methods of manufacturing a hexafluorophosphate have various problems such as poor workability, reactions under severe conditions, use of expensive raw materials, and disposal of by-products. Therefore, the manufacturing cost increases.

PRIOR ART DOCUMENTS

Patent Documents

Patent Document 1: Japanese Unexamined Patent Publication No. 06-056413
Patent Document 2: Japanese Unexamined Patent Publication No. 5-279003
Patent Document 3: Japanese Published Patent Publication No. 2005-507849

Non-Patent Document

Non-Patent Document 1: Fluorine Chemistry Vol. 1 (1950)

DISCLOSURE OF THE INVENTION

Problems to be Solved by the Invention

In light of the problems described above, the present invention has been made and an object thereof is to provide a method of manufacturing a hexafluorophosphate, that can simply and easily manufacture an inexpensive and high-quality hexafluorophosphate while suppressing the manufacturing cost, an electrolytic solution containing a hexafluorophosphate, and an electricity storage device including the electrolytic solution.

Means for Solving the Problems

The present inventors have intensively studied about a method of manufacturing a hexafluorophosphate, an electrolytic solution containing a hexafluorophosphate, and an electricity storage device including the electrolytic solution, in order to solve the above-described problems. As a result, they have found that the above-described objects of the present invention can be achieved by adopting the constitutions described hereinafter, and thus the present invention has been completed.

That is, in order to achieve the above described object, the present invention relates to a method of manufacturing a hexafluorophosphate, which comprises reacting at least a phosphorus compound with a fluoride represented by $MF_s \cdot r(HF)$ (wherein $0 \leq r \leq 6$, $1 \leq s \leq 3$, and M is at least one kind selected from the group consisting of Li, Na, K, Rb, Cs, $NH_4$, Ag, Mg, Ca, Ba, Zn, Cu, Pb, Al and Fe) to produce a hexafluorophosphate represented by the chemical formula $M(PF_6)_s$.

It is preferable that the phosphorus compound is dissolved in a solvent to prepare a phosphorus compound solution and then the fluoride is added to the solution dissolving the phosphorus compound. This is because the fluoride generally exhibits slightly solubility in a solvent having a low dielectric constant and an organic solvent. It is possible to facilitate the reaction in a solvent by adding a fluoride after dissolving a phosphorus compound in the solvent in advance.

It is preferable that the amount of the fluoride to be added to the phosphorus compound solution is stoichiometrically equivalent or less than the amount of a phosphorus atom in the phosphorus compound. Thus, the entire fluoride can be made to react with a phosphorus atom. As a result, the unreacted fluoride does not remain, thus making it possible to manufacture a hexafluorophosphate solution in a non-slurry state.

It is preferable that a solution of a hexafluorophosphate in a non-slurry state produced by reacting the phosphorus compound with the fluoride in the solvent is used as a solvent for preparation of the phosphorus compound solution. The solution of a hexafluorophosphate is produced by reacting a phosphorus compound with a fluoride in the amount that is stoichiometrically equivalent or less than that of a phosphorus atom in the phosphorus compound, and is therefore in a non-slurry state. Therefore, it is possible to repeatedly use the solution of a hexafluorophosphate as a solvent for preparation of the phosphorus compound solution in place of an initial solvent, thus making it possible to perform continuous operation and to improve the productivity of the hexafluorophosphate.

It is preferable that the phosphorus compound forms at least a $PF_6^-$ ion in the solvent.

It is preferable that a hydrogen fluoride solution is used as the solvent.

It is preferable that an organic solvent is used as the solvent.

It is preferable that the organic solvent is at least either a non-aqueous organic solvent or a non-aqueous ionic liquid. Thus, similarly to the anhydrous HF solvent, hydrolysis can be prevented. When the hydrolysis occurs, components insoluble in oxyfluorophosphoric acid and acidic substances such as HF and phosphoric acid, or the above-described solvents, for example, oxyfluorophosphates and phosphates are produced. When an electrolytic solution containing acidic substances and insoluble components is used in the electricity storage device, the solution exerts adverse influences such as corrosion of the electricity storage device and deterioration of electrical characteristics. Therefore, a solvent having low moisture concentration is preferably used as the solvent. From such a point of view, the moisture concentration of the solvent is preferably 100 ppm by weight or less, more preferably 10 ppm by weight or less, and particularly preferably 1 ppm by weight or less.

In order to achieve the above described object, the present invention relates to an electrolytic solution containing the hexafluorophosphate obtained by the method of manufacturing a hexafluorophosphate.

In order to achieve the above described object, the present invention relates to an electricity storage device comprising the electrolytic solution. Examples of the electricity storage device of the present invention include a lithium ion secondary battery.

Effects of the Invention

The present invention exerts the following effects by means described above.

According to the present invention, it is possible to manufacture an inexpensive and high-quality hexafluorophosphate without requiring a complicated treating operation and a special facility, using a low-quality raw material. It is also possible to obtain an electricity storage device, that has high safety and is also excellent in electrical characteristics, by applying a high-quality hexafluorophosphate obtained by the present invention to an electrolytic solution.

MODE FOR CARRYING OUT THE INVENTION

One embodiment of the present invention will be described in the following. The method of manufacturing a hexafluorophosphate according to the present embodiment is performed by reacting at least a phosphorus compound with a fluoride represented by $MF_s \cdot r(HF)$ (wherein $0 \leq r \leq 6$, $1 \leq s \leq 3$, and M is at least one kind selected from the group consisting of Li, Na, K, Rb, Cs, $NH_4$, Ag, Mg, Ca, Ba, Zn, Cu, Pb, Al and Fe).

The raw material made up of a phosphorus compound and a fluoride contained therein may be in any state of liquid, gas and solid. The raw material may also be formed into a solution by dissolving it in water, an anhydrous hydrogen fluoride solvent or an organic solvent.

The phosphorus compound is not particularly limited and examples thereof include white phosphorus, red phosphorus, black phosphorus, phosphorus trichloride ($PCl_3$), phosphorus tribromide ($PBr_3$), phosphine ($PH_3$), phosphorous acid, phosphorus pentaoxide ($P_2O_5$), orthophosphoric acid ($H_3PO_4$), polyphosphoric acid, metaphosphoric acid, pyrophosphoric acid, triphosphoric acid, isohypophosphoric acid, phosphonic acid, phosphinic acid, phosphenic acid, diphosphonic acid, cyanophosphoric acid, cyanophosphonic acid, diethyldithiophosphinic acid, chlorophenylphosphonic acid, trimethyl phosphate, o-methyl phenylselenophosphinate, pyrophosphonic acid, oxyphosphorus halides such as phosphorus oxychloride ($POCl_3$), phosphorus oxybromide ($POBr_3$), phosphorus oxyiodide ($POI_3$) and phosphorus oxyfluoride ($POF_3$), phosphorus pentasulfide ($P_2S_5$), phosphorus thiofluoride ($PSF_3$), trichlorophosphine sulfide ($PSCl_3$), phosphonitrile fluoride ($PNF_2$), phosphonitrile chloride ($PNCl_2$), phosphorus pentachloride, phosphorus pentabromide, phosphorus pentaiodide, $HPF_6$, $LiPF_6$, $NaPF_6$, $KPF_6$, $RbPF_6$, $CsPF_6$, $NH_4PF_6$, $AgPF_6$, $Mg(PF_6)_2$, $Ca(PF_6)_2$, $Ba(PF_6)_2$, $Zn(PF_6)_2$, $Cu(PF_6)_2$, $Pb(PF_6)_2$, $Al(PF_6)_3$ and $Fe(PF_6)_3$. These phosphorus compounds can be used alone, or two or more kinds thereof can be used in combination.

The fluoride is represented by $MF_s \cdot r(HF)$ (wherein $0 \leq r \leq 6$, $1 \leq s \leq 3$, and M is at least one kind selected from the group consisting of Li, Na, K, Rb, Cs, $NH_4$, Ag, Mg, Ca, Ba, Zn, Cu, Pb, Al and Fe). Also, the method of manufacturing $MF_s \cdot r(HF)$ is not particularly limited and it is possible to use a fluoride $MF_s \cdot r(HF)$ obtained by reacting an oxide, a hydroxide, a carbonate or a chloride containing, as M, at least one kind selected from the group consisting of Li, Na, K, Rb, Cs, $NH_4$, Ag, Mg, Ca, Ba, Zn, Cu, Pb, Al and Fe with excess HF ($0 \leq r \leq 6$). In addition, $MF_s \cdot r(HF)$ produced as by-products by the reaction of the following chemical reaction scheme may be recycled.

$$M(PF_6)_s + HF \rightarrow PF_5 + MF_s \cdot r(HF) \quad \text{[Chemical Formula 1]}$$

(wherein HF is used in a stoichiometrical amount or more)

When the excess fluoride is manufactured by reacting M, or an oxide, a hydroxide, a carbonate or a chloride containing M with HF, it is preferred to use an aqueous HF solution having a high concentration of 50% by weight or more, and more preferably anhydrous HF. Formation of a hydrate can be prevented by using the aqueous HF solution having a high concentration. Also, when anhydrous HF is used, production of a hydrate can be prevented and contamination with moisture disappears. Thus, it is possible to prevent production of impurities such as oxyfluorides in the manufacture of a hexafluorophosphate.

As the fluoride, LiF, LiF.(HF), NaF, NaF.(HF), KF.(HF), RbF.(HF) or CsF is in the form of a crystal that has no hygroscopicity and is excellent in fluidity. In the case of placing the fluoride in manufacturing facilities for mixing, there is an advantage that workability is remarkably improved and also mechanization can be easily attempted. As a matter of course, productivity of a hexafluorophosphate is improved.

However, when the fluoride is mixed with a hydrogen fluoride solution in advance, slight heat generation occurs. Therefore, it is preferred that the fluoride is slowly added under stirring after cooling the hydrogen fluoride solution to the temperature within a range from 5 to 15° C., thus obtaining a solution of the fluoride.

The content of the phosphorus atom in the raw material is not particularly limited and is preferably 0.01% by weight or more and 25% by weight or less, more preferably 0.01% by weight or more and 15% by weight or less, and particularly preferably 0.1% by weight or more and 10% by weight or less. When the content of the phosphorus atom is less than 0.01% by weight, the yield of phosphorus pentafluoride may decrease. In contrast, when the content of the phosphorus atom is more than 25% by weight, if the raw material is in the form of a solution, the viscosity of the solution increases. As a result, a problem may arise when liquid transfer is performed. Also, a problem of generation of a gas may arise.

The number of fluorine atoms relative to that of phosphorus atoms in the raw material is preferably the number that is chemically equivalent or more than that in the case where a $PF_6^-$ ion is formed.

The hexafluorophosphate is preferably synthesized, for example, by dissolving the phosphorus compound in a solvent to prepare a phosphorus compound solution and adding the fluoride to the phosphorus compound solution. In this case, there is no particular limitation on the method of adding a phosphorus compound to a solvent, and the synthesis can be carried out by either a continuous or batch method. The solvent may be placed after placing a phosphorus compound in a mixing vessel, or the phosphorus compound may be placed after placing the solvent in the mixing vessel. The synthesis can also be carried out by reacting a fluoride ($MF_s \cdot r(HF)$) solution with a phosphorus compound. In this case, heat generation scarcely occurs during the reaction. As a result, since there is no need to perform cooling, the mixing method is not particularly limited.

It is preferred that the amount of the fluoride to be added to the phosphorus compound solution is stoichiometrically equivalent or less than that of a phosphorus atom in the phosphorus compound. Therefore, the entire fluoride can be made to react with the phosphorus atom. As a result, the unreacted fluoride does not remain, thus making it possible to manufacture a hexafluorophosphate solution in a non-slurry state. Furthermore, the hexafluorophosphate solution in a non-slurry state enables use as the solvent for manufacturing the phosphorus compound solution. As a result, it becomes possible to perform continuous operation and the productivity of the hexafluorophosphate can be improved.

As the reaction of a phosphorus compound with a fluoride proceeds, HF may be produced as by-products in the synthesis of a hexafluorophosphate. In this case, HF produced as by-products can be utilized as the solvent by cooling the reaction vessel within a range from 5 to 15° C. Therefore, addition of the solvent is not necessarily required and the hexafluorophosphate can be synthesized only by placing a phosphorus compound and a fluoride in the reaction vessel, followed by stirring. In this case, since an anhydrous HF solution of a hexafluorophosphate is produced in the reaction vessel, the phosphorus compound and the fluoride may be further added. Thus, the synthesis of $M(PF_6)_s$ in the non-aqueous system can be easily performed. It is also possible to prevent the generation of impurities such as a phosphorus oxyfluoride salt due to hydrolysis because of the non-aqueous system, and thus a high-quality hexafluorophosphate with low moisture concentration can be obtained.

When the phosphorus compound has an oxygen atom and a hydrogen atom, water and HF may be produced as by-products as the reaction with the fluoride proceeds. Also in this case, it is preferred to cool inside the reaction vessel within a range from 5 to 15° C., thus making it possible to utilize water and HF produced as by-products as the solvent. Therefore, addition of the solvent is not necessarily required and the hexafluorophosphate can be easily synthesized only by placing a phosphorus compound and a fluoride in the reaction vessel, followed by stirring. In this case, when the amount of water produced as by-products increases, impurities such as a phosphorus oxyfluoride salt are produced as by-products. Therefore, it is preferred that the concentration of water produced as by-products is low. The moisture concentration of the solution in the reaction vessel, including water produced as by-products, is preferably 100 ppm by weight or less, more preferably 10 ppm by weight or less, and particularly preferably 1 ppm by weight or less.

The solvent in which the phosphorus compound is dissolved not particularly limited and, for example, a hydrogen fluoride solution and an organic solvent can be used.

When the hydrogen fluoride solution is used as the solvent, it may be used in the form of anhydrous hydrogen fluoride, or may be used after dissolving it in water, an organic solvent, or a mixed solvent of water and an organic solvent. Hydrogen fluoride is not particularly limited and, for example, commercially available hydrofluoric acid of an industrial grade, a general grade, a semiconductor grade or the like can be used as it is, or used after appropriately adjusting the concentration. In view of a small amount of impurities, hydrofluoric acid of a semiconductor grade is preferably used. In view of the cost, anhydrous hydrogen fluoride, industrial grade or general grade is preferably used. As the concentration of impurities, the concentration of each metal impurity is preferably 500 ppm by weight or less.

When the hydrogen fluoride solution is used as the solvent, it is preferably used in a liquid state and the concentration of a polyatomic ion having a phosphorus atom and a fluorine atom existing in the solution is within a range from 0.03% by weight to 50% by weight, and preferably from 0.5% by weight to 20% by weight. It is not necessary that the phosphorus compound is completely dissolved in the solution, and the phosphorus compound may be in a suspended state.

The temperature at which the phosphorus compound is mixed with the hydrogen fluoride solution is not particularly limited, and is preferably within a range from −50 to 200° C. When the temperature is lower than −50° C., a composition containing a phosphorus compound and a fluoride is sometimes solidified. In contrast, it is sometimes not preferred that the temperature is higher than 200° C. since a special facility is required in view of heat resistance or the like.

The organic solvent is preferably at least either of a non-aqueous organic solvent or a non-aqueous ionic liquid. Furthermore, an aprotic organic solvent is preferable. Since the aprotic organic solvent does not have capability of donating hydrogen ions, the solution of the hexafluorophosphate obtained by the manufacturing method of the present invention can be applied directly to an electrolytic solution of electricity storage devices such as a lithium ion secondary battery.

The non-aqueous organic solvent is not particularly limited and examples thereof include ethylene carbonate, propylene carbonate, butylene carbonate, vinylene carbonate, dimethyl carbonate, diethyl carbonate, methylethyl carbonate, methyl acetate, ethyl acetate, γ-butyl lactone, acetonitrile, dimethylformamide, 1,2-dimethoxyethane, methanol and isopropanol. Of these organic solvents, preferred solvents are those that are less likely to cause precipitation of the produced hexafluorophosphate, in other words, those having excellent solubility of the hexafluorophosphate, for example, ethylene carbonate, propylene carbonate, dimethyl carbonate, diethyl carbonate, methylethyl carbonate, acetonitrile and 1,2-dimethoxyethane in view of continuous manufacturing. These organic solvents may be used alone, or two or more kinds thereof may be used in combination.

Furthermore, examples of the non-aqueous and aprotic organic solvent include a cyclic carbonic acid ester, a chain carbonic acid ester, a carboxylic acid ester, a nitrile, an amide and an ether compound. These non-aqueous aprotic organic solvents may be used alone, or two or more kinds thereof may be used in combination.

The non-aqueous ionic liquid is not particularly limited and examples thereof include a fluoride complex salt or a fluoride salt of a quaternary ammonium, a quaternary phosphonium or the like. Specific examples of the quaternary ammonium cation include a tetraalkylammonium cation, an imidazolium cation, a pyrazolium cation, a pyridinium cation, a triazolium cation, a pyridazinium cation, a thiazolium cation, an oxazolium cation, a pyrimidinium cation and a pyrazinium cation. Furthermore, specific examples of the quaternary phosphonium cation include a tetraalkyl phosphonium cation. These non-aqueous ionic liquids may be used alone, or two or more kinds thereof may be used in combination, or may be dissolved in the non-aqueous organic solvent.

The organic solvent may be a non-aqueous organic solvent or a non-aqueous ionic liquid alone or two or more kinds thereof.

The temperature of the reaction of the phosphorus compound with the fluoride is not particularly limited and is preferably within a range from −40° C. to 100° C., and more preferably from −20° C. to +50° C. taking the productivity of the hexafluorophosphate into consideration. When the reaction temperature is higher than 100° C., HF may scatter. In contrast, when the reaction temperature is lower than −40° C., the reaction rate may decrease.

Furthermore, it is preferred to take out the synthesized $M(PF_6)_s$ in the form of a crystal by the crystallization method. In that case, there is no particular limitation on the crystallization temperature. For example, as the crystallization temperature becomes lower, the yield increases. However, the manufacturing cost increases in view of incidental facilities or productivity. Therefore, the crystallization temperature is preferably −40° C. or more and +100° C. or less, more preferably −30° C. or more and +50° C. or less, and particularly preferably −20° C. or more and +20° C. or less.

The reaction time or crystallization time is not particularly limited and is, for example, 0.5 hours or more and less than 72 hours, preferably 1 hour or more and 48 hours or less, more preferably 1.5 hours or more 8 hours or less, and particularly preferably 2 hours or more and 6 hours or less. When the reaction time or crystallization time is less than 0.5 hours, the yield of the hexafluorophosphate may decrease. In contrast, when the reaction time or crystallization time is 72 hours or more, productivity of the hexafluorophosphate may deteriorate.

The crystallized $M(PF_s)$ is subjected to solid-liquid separation. The method of solid-liquid separation is not particularly limited and examples thereof includes filtration. As the filtration method, for example, conventionally known various filtration methods such as natural filtration, pressure filtration and centrifugal filtration can be employed.

After the solid-liquid separation, the filtrate is preferably rinsed. It is possible to increase the purity of $M(PF_6)_s$ by this rinsing operation. In the rinsing operation, for example, known methods such as a method of rinsing by dispersing $M(PF_6)_s$ again in a cleaning agent and a method of rinsing by directly placing a cleaning agent in a separator and bringing $M(PF_6)_s$ into contact with the cleaning agent can be used alone or in combination.

The filtrate obtained after the solid-liquid separation sometimes contains a large amount of an excess $M(PF_6)_s$ salt solution or acid. In this case, when the filtrate is distilled to collect the $MPF_6$ salt solution or acid, it becomes possible to perform cost reduction and collection of valuables by load reduction of a waste water treatment, thus making it possible to exert double effects.

The cleaning agent is not particularly limited and it is possible to use any of anhydrous HF, high concentration HF, diluted HF and pure water. For example, it is also possible to rinse $M(PF_6)_s$ with an alkali salt of the same cation (for example, $K_2CO_3$ or $KHCO_3$ is used in the case of the synthesis of $KPF_6$) for the purpose of neutralizing an acid. As described above, influences such as corrosion with the acid in the subsequent step as well as contamination of products with metal impurities can be suppressed by neutralization with an alkali.

The temperature of the $M(PF_6)_s$ crystal itself formed upon solid-liquid separation is not particularly limited, and is preferably −40° C. or higher and +30° C. or lower, more preferably −20° C. or higher and +20° C. or lower, and particularly preferably −5° C. or higher and +20° C. or lower.

When the filtrate obtained after solid-liquid separation is rinsed, the solution temperature of the cleaning agent is not particularly limited, and is preferably −40° C. or higher and +100° C. or lower, more preferably −20° C. or higher and +50° C. or lower, and particularly preferably −5° C. or higher and +20° C. or lower.

It is preferred to dry $M(PF_6)_s$ obtained by solid-liquid separation. The drying method is not particularly limited and examples thereof include air drying, thermal drying and vacuum drying. The drying time is not also particularly limited and is preferably from 0.5 to 72 hours in general. The drying is preferably performed at the drying temperature lower than 120° C. When the drying is performed at the temperature of 120° C. or higher, drying equipment becomes expensive and a large heat quantity is required, resulting in high manufacturing cost. As the temperature becomes higher, $M(PF_6)_s$ may be decomposed by a trace amount of water. Therefore, it is particularly preferred to perform drying at the drying temperature of 85 to 110° C.

$M(PF_6)_s$ having a moisture content of 50 ppm by weight or less can be manufactured simply and easily by the above-described method. According to this method, an inexpensive raw material can be used and also an easy manufacturing method is used, then, the manufacturing cost can be reduced.

Furthermore, the hexafluorophosphate obtained by the above-described method may be subjected to salt exchange in accordance with the following Chemical scheme B.

(Scheme B)

[Chemical Formula 2]

(wherein J is at least one kind selected from the group consisting of Li, Na, K, Rb, Cs, $NH_4$, Ag, Mg, Ca, Ba, Zn, Cu, Pb, Al and Fe, $1 \leq t \leq 3$, $0 \leq k \leq 6$, $1 \leq s \leq 3$, and $0 \leq r \leq 6$)

In Chemical scheme B, the proportion of $JF_t \cdot k(HF)$ relative to $M(PF_6)_s$ is preferably from 1 to 2 equivalents, and more preferably from 1.0 to 1.1 equivalents. When the proportion is less than 1 equivalent, there arises a problem that the unsubstituted $M(PF_6)_s$ remains and coexists. In contrast, when the proportion is more than 2 equivalents, the unreacted $JF_t \cdot k$ (HF) may be mixed in the product $J(PF_6)_t$.

The solvent used in salt exchange is not particularly limited and examples thereof include anhydrous HF, high concentration HF having a concentration of 50% by weight or more, diluted HF, pure water and an organic solvent. Of these solvents, anhydrous HF and high concentration HF are preferably used in view of prevention of production of oxyfluorides.

The amount of the solvent to be used is not also particularly limited and is, for example, preferably from 0.5 to 10 times, and more preferably from 1 to 5 times, as that of the weight of the hexafluorophosphate. When the amount is more than 10 times, the amount of the hexafluorophosphate dissolved increases and the yield may decrease. In contrast, when the amount is less than 0.5 times, the unreacted $JF_t \cdot k(HF)$ or $MF_s \cdot r(HF)$ produced as by-products may be mixed in $J(PF_6)_t$.

The method of adding the raw material in the salt exchange is not particularly limited and may be, for example, a method of adding a solution prepared by dissolving $M(PF_6)_s$ or $JF_t \cdot k$ (HF) in a solvent at a time or by simultaneous dropping or a method of adding one to the other one. It is also possible that the reaction vessel is filled with a solvent and $M(PF_6)_s$ or $JF_t \cdot k$ (HF) is slowly added to the solvent. It is also possible that a solvent is slowly added to $M(PF_6)_s$ or $JF_t \cdot k(HF)$. However, the reaction is preferably performed after dissolving the raw material so that the unreacted substance such as the raw material is not mixed in the produced $J(PF_6)_t$.

The reaction temperature and reaction time in the salt exchange may be the same as those in the case of the synthesis of the hexafluorophosphate. The crystallization method, solid-liquid separation, rinsing and drying may be performed under the same conditions as those in the above-described case.

Therefore, $M(PF_6)_s$ having a moisture content of 50 ppm by weight or less can be easily manufactured even by the method using salt exchange. In this method, an inexpensive raw material can be used and also an easy manufacturing method is used, then, the manufacturing cost can be reduced.

The reaction apparatus used in the present invention is not particularly limited as long as it is made of a material having resistance to the above-described composition, and stainless steel or carbon steel are preferably used as the material. When a composition composed of anhydrous HF or the above-described composition is leaked or exposed in air, the reaction apparatus may be corroded thereby. When the reaction apparatus is corroded, the resultant product is contaminated with the corroded substance and the contaminant may cause an increase in the metal component content in the product. Therefore, it is preferred to use, as the reaction apparatus, those that have resistance to the above-described composition and are made of a fluororesin, vinyl chloride or polyethylene, or those lined therewith.

EXAMPLES

Preferred examples of this invention will be demonstratively described in detail hereinafter. However, for the materials, blend amounts thereof, and the like described in these examples and comparative examples, the scope of this invention is not limited thereto unless they are in particular restrictively described. Thus, the materials and the like are merely explanatory examples.

Example 1

In a 5 L reaction vessel made of a fluororesin, 1,000 g of ultrapure water was poured and the reaction vessel was heated in an oil bath, and then ultrapure water was maintained at 40° C. While stirring this ultrapure water by a rotator, 800 g of commercially available acidic ammonium fluoride ($NH_4F \cdot (HF)$) was added little by little and then dissolved.

While maintaining the temperature of the solution in the reaction vessel at 40° C., 740 g of a $POF_3$ gas was made to be absorbed in the reaction solution by bubbling. The absorption amount was determined by an increase in the weight of the reaction solution. After making the $POF_3$ gas to be absorbed, the temperature of the reaction solution was adjusted to 20° C. while stirring for 2 hours and then the liquid temperature was maintained at a same temperature.

Next, the reaction vessel was heated again in the oil bath and the solution in the reaction vessel was evaporated to dryness. The crystal remaining in the reaction vessel was collected, rinsed with 750 g of an aqueous 75% HF solution and then filtered by suction filtration. The liquid temperature of the aqueous 75% HF solution used during rinsing was adjusted to 0° C., and the liquid temperature in the suction filtration was adjusted to 5° C.

Subsequently, a high purity $N_2$ gas was introduced into the reaction vessel at a rate of 3 L/minute, followed by drying using a dryer at 110° C. for 8 hours. Thus, a white crystal was obtained. This white crystal was analyzed by an X-ray diffractometer (XRD). As a result, it was confirmed that the white crystal is composed of $NH_4PF_6$.

Example 2

In a 3 L reaction vessel made of a fluororesin (PFA), 100 g of acidic potassium fluoride (KF.(HF)) and 500 g of a 75 wt % hydrogen fluoride (HF) solution of a semiconductor grade were placed, together with a rotator, and then KF(HF) was dissolved while stirring in an ice bath. After weighing 140 g of a 85 wt % phosphoric acid ($H_3PO_4$) solution in a separatory funnel, the solution was slowly added dropwise under an ice bath over 30 minutes and the reaction was performed for 6 hours while stirring.

Next, this solution was crystallized by cooling at −5° C. for 24 hours, thus obtaining a hydrogen fluoride solution containing a precipitate. This hydrogen fluoride solution was filtered by suction filtration. The liquid temperature of the hydrogen fluoride solution was −5° C. The concentration of HF of the filtrate was determined and found to be 46% by weight.

The collected crystal was rinsed with 600 g of a 75 wt % hydrogen fluoride (HF) solution of a semiconductor grade. The liquid temperature of the hydrogen fluoride solution was 0° C.

Subsequently, the filtrate after rinsing was transferred to a 3 L bottle made of a fluororesin (PFA) and then air-dried at 80° C. for 6 hours while blown with a high purity nitrogen gas at a rate of 3 L/min. The drying temperature was raised to 105° C. and drying was performed for 12 hours.

The resultant crystal was measured by XRD. As a result, it was confirmed that the crystal is composed of $KPF_6$. The amount of the resultant $KPF_6$ was 137 g and the yield was 61%. The moisture content of the resultant $KPF_6$ was measured by the Karl Fisher method and found to be 50 ppm by weight or less. Furthermore, the concentration of free hydrogen fluoride was measured by neutralization titration. As a result, the concentration of free hydrogen fluoride was 50 ppm by weight or less.

The yield of $KPF_6$ that was taken out as a crystal was 61%, and 86 g of $KPF_6$ was dissolved in the filtrate rinsed with the 75 wt % hydrogen fluoride (HF) solution. Therefore, it was found that the reaction proceeds nearly quantitatively.

Example 3

In a 3 L reaction vessel made of PFA, 210 g of cesium fluoride (CsF) and 700 g of a 75 wt % hydrogen fluoride (HF) solution of a semiconductor grade were placed, together with a reactor, and then CsF was dissolved under an ice bath while stirring. After weighing 175 g of a 85 wt % phosphoric acid ($H_3PO_4$) solution in a separatory funnel, the solution was slowly added dropwise under an ice bath over 30 minutes and the reaction was performed for 12 hours while stirring.

Next, this solution was crystallized by cooling at −5° C. for 36 hours, thus obtaining a solution containing a precipitate. This solution was filtered by suction filtration. The liquid temperature of the phosphoric acid solution was −5° C. The concentration of HF of the filtrate was determined and found to be 55% by weight.

The collected crystal was rinsed with 400 g of anhydrous hydrogen fluoride acid cooled to 0° C. Subsequently, the filtrate after rinsing was transferred to a 3 L bottle made of a fluororesin and then air-dried at 80° C. for 5 hours while blown with a high purity $N_2$ gas at a rate of 3 L/min. The drying temperature was raised to 105° C. and drying was performed for 12 hours.

The resultant crystal was measured by XRD. As a result, it was confirmed that the crystal is composed of $CsPF_6$. The amount of the resultant $CsPF_6$ was 352 g and the yield was 92%. The moisture content of the resultant $CsPF_6$ was measured by the Karl Fisher method and found to be 50 ppm by weight or less. Furthermore, the concentration of free hydrogen fluoride was measured by neutralization titration. As a result, the concentration of free hydrogen fluoride was 50 ppm by weight or less.

Example 4

In a 3 L reaction vessel made of a fluororesin, 500 g of an anhydrous hydrogen fluoride solution of an industrial grade was placed, together with a rotator, and 60 g of sodium fluoride (NaF) was slowly added and dissolved while stirring under an ice bath. Furthermore, 120 g of phosphorus oxyfluoride ($POF_3$) was made to be absorbed in this solution.

Next, this solution was crystallized by cooling at −20° C. for 48 hours, thus obtaining a solution containing a precipitate. This solution was filtered by suction filtration. The concentration of HF of the filtrate was determined and found to be 94% by weight.

The collected crystal was transferred to a 3 L bottle made of a fluororesin and 100 g of an anhydrous hydrogen fluoride solution cooled to 5° C. in advance was added, thereby dispersing the crystal. At this time, the contents of the reaction vessel were stirred for 30 minutes under an ice bath. Thereafter, the reaction vessel was allowed to standstill and the supernatant liquid was removed. While blowing a high purity $N_2$ gas at a rate of 3 L/min, air drying was performed at 80° C. for 6 hours. Thereafter, the drying temperature was raised to 105° C. and drying was performed for 6 hours.

The resultant crystal was measured by XRD. As a result, it was confirmed that the crystal is composed of $NaPF_6$. The amount of the resultant $NaPF_6$ was 148 g and the yield was 76% (the amount of $NaPF_6$ dissolved in the anhydrous hydrogen fluoride as a rinsing solution is not included). The moisture content of the resultant $NaPF_6$ was measured by the Karl Fisher method and found to be 50 ppm by weight or less. Furthermore, the concentration of free hydrogen fluoride was measured by neutralization titration. As a result, the concentration of free hydrogen fluoride was 50 ppm by weight or less.

Example 5

In a 5 L reaction vessel made of a fluororesin, 2,000 g of a 75 wt % hydrogen fluoride solution of a semiconductor grade was placed, together with a rotator, and the vessel was maintained under an ice bath while stirring. After weighing 420 g of a 85 wt % phosphoric acid solution in a separatory funnel, the solution was slowly added dropwise over 15 minutes under an ice bath and the reaction was performed for 3 hours while stirring.

Next, this solution was crystallized by cooling at −40° C. for 48 hours, thus obtaining a solution containing a precipitate. Furthermore, this solution was filtered by suction filtration. The weight of the crystal obtained by filtration before drying was measured and found to be 1,080 g. In the case of $HPF_6$ (free from crystal water), since the weight of the crystal is 532 g when the yield is 100%, it was confirmed that the actual measured weight is large even when the amounts of water and HF are added. Therefore, it was presumed that the crystal obtained by filtration before drying is in the form of $HPF_6 \cdot qH_2O$ with crystal water.

The concentration of HF of the filtrate was determined and found to be 71% by weight. When water does not transfers to the crystal side as crystal water, the theoretical value of the concentration of HF is 56% by weight. Therefore, it is considered that the crystal is in the form containing crystal water and $q \geq 2$.

Next, 330 g of NaF was placed in a 2 L reaction vessel made of a fluororesin and also 1,050 g of anhydrous HF was added while cooling with an ice bath to prepare an NaF/HF solution. Separately, the entire amount of $HPF_6 \cdot qH_2O$ obtained above was placed in a 3 L reaction vessel made of a fluororesin and the NaF/HF solution thus prepared was added over 20 minutes while stirring under an ice bath. After the reaction, the reaction solution was crystallized for 48 hours by cooling to −10° C.

Next, the supernatant of the 3 L-PFA reaction vessel was slowly removed and solid-liquid separation was performed. After separation, air drying was performed at 80° C. for 6 hours while blowing a high purity $N_2$ gas at a rate of 3 L/minutes. The drying temperature was raised to 105° C. and drying was performed for 3 hours.

The resultant crystal was measured by XRD and found to be composed of $NaPF_6$. The amount of the resultant $NaPF_6$ was 205 g and the yield was 33%. The moisture content of the resultant $NaPF_6$ was measured by the Karl Fisher method and found to be 420 ppm by weight or less.

Example 6

In order to recycle HF, 700 g of the 71% by weight HF filtrate collected in Example 5 was placed in a 3 L reaction vessel made of a fluororesin and also 140 g of anhydrous HF was added to prepare 840 g of a hydrogen fluoride solution having a concentration of 75% by weight.

After weighing 120 g of a phosphoric acid solution having a concentration of 85% by weight in a polyethylene vessel, the solution was added to the hydrogen fluoride solution at a time under an ice bath with stirring. After the addition, stirring was performed under an ice bath for 30 minutes.

Next, this solution was crystallized by cooling at −20° C. for 24 hours, thus obtaining a solution containing a precipitate. This solution was filtered by suction filtration. The weight of the crystal obtained by filtration before drying was measured and found to be 250 g. The concentration of HF of the filtrate was determined and found to be 72% by weight. The entire amount of the crystal before drying was transferred to a 1 L reaction vessel made of a fluororesin in which a rotator is placed.

After the reaction ($KPF_6 + HF \rightarrow PF_5 + KF \cdot (HF)$) was performed, the HF solution was completely concentrated and evaporated to dryness to collect 125 g of a white powder. This powder was analyzed by XRD. As a result, it was found that the powder is composed of a mixture of $KPF_6$ and $KF \cdot (HF)$ and $KF \cdot (HF)$ accounted for 90% by weight of the powder. The resultant $KPF_6/KF \cdot (HF)$ mixture was slowly added to the 1 L reaction vessel made of a fluororesin and then reacted at 20° C. for 48 hours. At the initial stage of the reaction, since the reaction was the reaction between solids, stirring was difficult. Thirty minutes after the reaction, the crystal formed into a liquid as a result of the generation of $H_2O/HF$ from the crystal. Thus, stirring became easy.

The precipitate obtained by the reaction was filtered by suction filtration. The collected crystal was rinsed with 400 g of pure water at 5° C. Furthermore, the crystal was dried at 105° C. for 24 hours.

The resultant crystal was measured by XRD and found to be composed of $KPF_6$. The amount of the resultant $KPF_6$ was 105 g and the yield was 55% (the amount of $KPF_6$ dissolved in pure water as a rinsing solution is not included). The moisture content of the resultant $KPF_6$ was measured by the Karl Fisher method and found to be 400 ppm by weight.

Example 7

Figure 1:
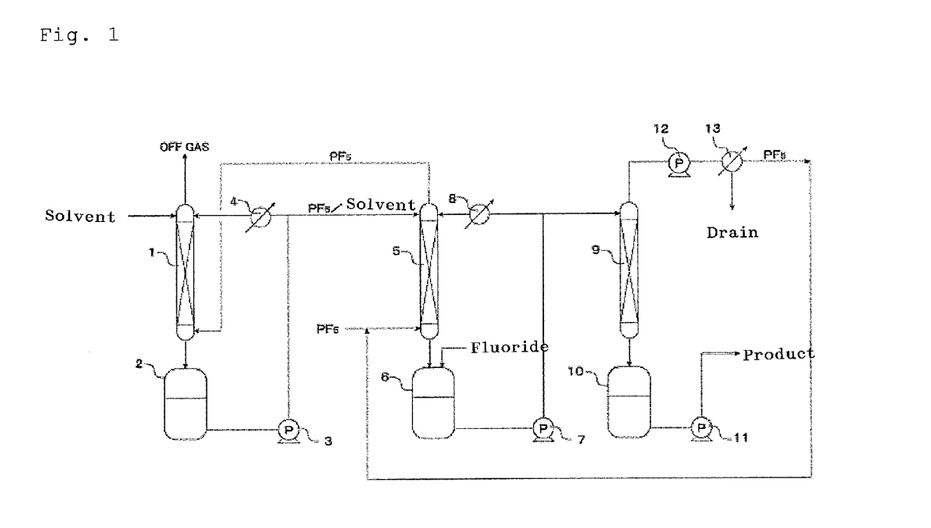
FIG. 1 is an illustrative drawing schematically showing a manufacturing apparatus of a hexafluorophosphate used in examples of the present invention.

In the present example, the operations were performed using the apparatus shown in FIG. 1. In a second vessel 6 made of a fluororesin, 250 g of commercially available battery grade diethyl carbonate (moisture concentration: 9 ppm by weight) and 250 g of ethylene carbonate (moisture concentration: 7 ppm by weight) were placed and then fed and circulated to the tower top of a second absorption tower 5 using a pump 7. The temperature of the second vessel 6 was adjusted to a constant temperature of 20° C. using a refrigerator 8. Next, $PF_5$ was fed to the tower bottom of the second absorption tower 5 at a flow rate of 0.5 L/min for 25.5 minutes, thus introducing 64.3 g of $PF_5$ (first step).

Next, 13.0 g of lithium fluoride as a fluoride was fed to the second vessel 6. Lithium fluoride was quickly dissolved in an organic solvent containing $PF_5$ and then reacted with $PF_5$ in the organic solvent, thus obtaining 577.3 g of a lithium solution of a hexafluorophosphate (second step).

Furthermore, 250 g of diethyl carbonate and 250 g of ethylene carbonate were added to the second vessel 6, and the same operation as that described above was performed (third step). 275 g of the resultant lithium solution of a hexafluorophosphate was transferred to a third vessel 10 and, after adjusting the temperature to a constant temperature of 20° C., excess dissolved $PF_5$ was distilled off by decompression using an air pump 12. The thus obtained diethyl carbonate/ethyl carbonate solution of lithium hexafluorophosphate contained 10 ppm by weight or less of an insoluble component, 10 ppm by weight or less of free acid and 10 ppm by weight or less of moisture.

Figure 2:
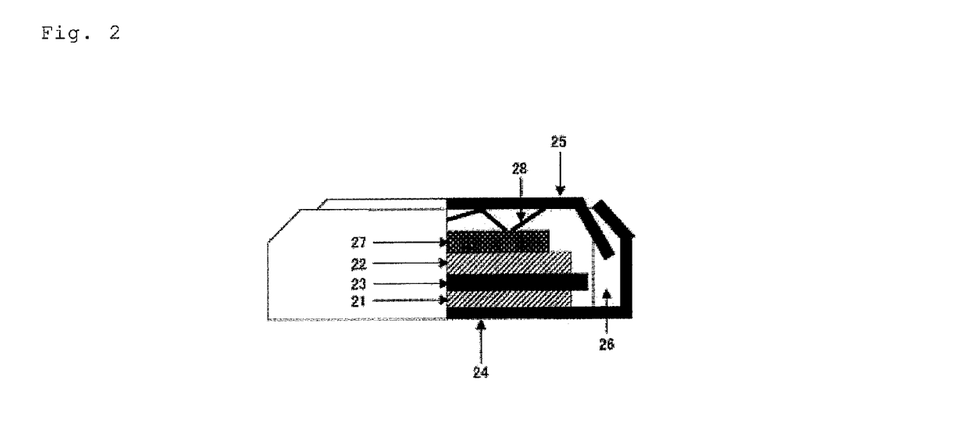
FIG. 2 is an illustrative drawing schematically showing a sectional view of a lithium ion secondary battery of the present invention.

Next, a coin type non-aqueous electrolyte lithium secondary battery as shown in FIG. 2 was manufactured using the thus obtained solution and performance as an electrolytic solution were evaluated by a charge/discharge test. Specifically, the test was performed by the following procedure.

<Fabrication of Negative Electrode 22>

Natural graphite and polyvinylindene fluoride (PVdF) as a binder were mixed at a weight ratio of 9:1 and N-methyl pyrrolidone was added thereto to obtain a paste. This paste was uniformly applied to a 22 μm thick copper foil using an applicator for electrode coating. This coated foil was vacuum dried at 120° C. for 8 hours and a negative electrode 22 having a diameter of 16 mm was obtained by an electrode punching machine.

<Fabrication of Positive Electrode 21>

A $LiCoO_2$ powder, acetylene black as a conductive auxiliary and PVdF as a binder were mixed at a weight ratio of 90:5:5 and N-methylpyrrolidone was added to this mixture to obtain a paste. This paste was uniformly applied to a 22 μm thick copper foil using an applicator for electrode coating. This coated foil was vacuum dried at 120° C. for 8 hours and a positive electrode 21 having a diameter of 16 mm was obtained by an electrode punching machine.

<Fabrication of Coin Type Non-Aqueous Electrolyte Lithium Ion Secondary Battery>

The positive electrode 21 was disposed on the bottom face of a positive electrode can 24 and a porous separator 23 made of polypropylene was disposed thereon, and then the non-aqueous electrolytic solution prepared in Example 2 was injected and a gasket 26 was inserted. On the separator 23, the negative electrode 22, a spacer 27, a spring 28 and a negative electrode can 25 were subsequently disposed, and then sealing was performed by folding an opening portion of the positive electrode can 24 inward using a coin type battery caulking machine to obtain a non-aqueous electrolyte lithium ion secondary battery. Subsequently, charging was performed at a constant current of 0.4 mA and, when the voltage reached 4.1 V, charging was performed at a constant voltage of 4.1 V for 1 hour. Discharging was performed at a constant current of 1.0 mA until the voltage reached 3.0 V. When the voltage reached 3.0 V, after maintaining at 3.0 V for 1 hour, a charge/discharge test was carried out by charge/discharge cycle. As a result, the charge/discharge efficiency was around 100%, and charging and discharging were repeated for 150 cycles. As a result, the charge capacity did not change.

Comparative Example 1

In the present comparative example, the operations were performed using the apparatus shown in FIG. 1. Commercially available battery grade diethyl carbonate (moisture concentration: 9 ppm by weight) was placed in a first vessel 2 and a second vessel 6, each being made of a fluororesin, in the amount of 3 L each, and then a circulating operation in each absorption tower and vessel was started using pumps 3 and 7. At this time, the flow rate of the pumps 3 and 7 was adjusted to 1 L/minute. The first vessel 2 and the second vessel 6 were respectively maintained at a constant temperature of 20° C. using a first refrigerator 4 and a second refrigerator 8.

Next, a phosphorus pentafluoride gas was fed to the tower bottom of the second absorption tower 5 at a rate of 6.34 g/minute. This phosphorus pentafluoride gas was made to be absorbed in an organic solvent for 2 minutes, and feeding of lithium fluoride to the second vessel 6 was started at a rate of 1.55 g/minute. Sixty minutes after starting of feeding of lithium fluoride, the second absorption tower 5 was occluded with slurry-like lithium fluoride, which made the operation difficult.

(Results)

As is apparent from Examples 1 to 7, it was confirmed that an inexpensive and high-quality hexafluorophosphate $(M(PF_6)_s)$ is manufactured while suppressing the manufacturing cost by reacting a phosphorus compound with a fluoride. The fluoride used in each example can be easily synthesized by excessively reacting Li, Na, K, Rb, Cs, $NH_4$, Ag, Mg, Ca, Ba, Zn, Cu, Pb, Al or Fe, or an oxide, a hydroxide, a carbonate or a chloride containing the same with HF. Therefore, the method of the present invention is excellent since any fluoride is easily available and the manufacturing cost can be reduced as compared with a conventional method of manufacturing a hexafluorophosphate.

INDUSTRIAL APPLICABILITY

According to the present invention, it is possible to manufacture an inexpensive and high-quality phosphorus pentafluoride with low moisture concentration and high purity without requiring a complicated treating operation and a special device, using a low-quality raw material. The high-quality hexafluorophosphate obtained by the present invention can be suitably used in an electrolytic solution for an electricity storage device, a catalyst for an organic synthesis reaction, or the like. Among the hexafluorophosphates, lithium hexafluorophosphate, sodium hexafluorophosphate and potassium hexafluorophosphate can be used as an electrolyte of electricity storage devices for personal computers, portable phones and hybrid cars. Also, silver hexafluorophosphate can be utilized as counter ions that generate an acid required for initiation and growth reactions in photopolymerization. Furthermore, ammonium hexafluorophosphate is useful as a raw material that is used in the manufacture of a pharmaceutical intermediate.

DESCRIPTION OF LETTERS OR NUMERALS

1 First absorption tower
2 First vessel
3 Pump
4 Refrigerator
5 Second absorption tower
6 Second vessel
7 Pump
8 Refrigerator
9 Deaeration tower
10 Third vessel
12 Air pump
13 Condenser
21 Positive electrode
22 Negative electrode
23 Porous separator
24 Positive electrode can
25 Negative electrode can
26 Gasket
27 Spacer
28 Spring

The invention claimed is:

1. A method of manufacturing a hexafluorophosphate, which comprises reacting at least a phosphorus compound with a fluoride represented by $MF_s \cdot r(HF)$ (wherein $0 \leq r \leq 6$, $1 \leq s \leq 3$, and M is at least one kind selected from the group consisting of Li, Na, K, Rb, Cs, $NH_4$, Ag, Mg, Ca, Ba, Zn, Cu, Pb, Al and Fe) to produce a solid hexafluorophosphate represented by the chemical formula $M(PF_6)_s$, wherein the phosphorus compound contains at least one compound selected from the group consisting of white phosphorus, black phosphorus, phosphorus tribromide ($PBr_3$), phosphine ($PH_3$), phosphorous acid, orthophosphoric acid ($H_3PO_4$), polyphosphoric acid, metaphosphoric acid, pyrophosphoric acid, triphosphoric acid, isohypophosphoric acid, phosphonic acid, phosphinic acid, phosphenic acid, diphosphonic acid, cyanophosphoric acid, cyanophosphonic acid, diethyldithiophosphinic acid, chlorophenylphosphonic acid, trimethyl phosphate, o-methyl phenylselenophosphinate, pyrophosphonic acid, oxyphosphorus halides, phosphorus pentasulfide ($P_2S_5$), phosphorus thiofluoride ($PSF_3$), trichlorophosphine sulfide ($PSCl_3$), phosphonitrile fluoride ($PNF_2$), phosphonitrile chloride ($PNCl_2$), phosphorus pentabromide, phosphorus pentaiodide, $HPF_6$, $LiPF_6$, $RbPF_6$, $CsPF_6$, $AgPF_6$, $Mg(PF_6)_2$, $Ca(PF_6)_2$, $Ba(PF_6)_2$, $Zn(PF_6)_2$, $Cu(PF_6)_2$, $Pb(PF_6)_2$, $Al(PF_6)_3$, and $Fe(PF_6)_3$.

2. The method of manufacturing a hexafluorophosphate according to claim 1, wherein the phosphorus compound is dissolved in a solvent to prepare a phosphorus compound solution and then the fluoride is added to the phosphorus compound solution.

3. The method of manufacturing a hexafluorophosphate according to claim 2, wherein the amount of the fluoride to be added to the phosphorus compound solution is stoichiometrically equivalent or less than the amount of a phosphorus atom in the phosphorus compound.

4. The method of manufacturing a hexafluorophosphate according to claim 3, wherein a solution of a hexafluorophosphate in a non-slurry state produced by reacting the phosphorus compound with the fluoride in the solvent is used as a solvent for preparation of the phosphorus compound solution.

5. The method of manufacturing a hexafluorophosphate according to claim 2, wherein the phosphorus compound forms at least a $PF_6^-$ ion in the solvent.

6. The method of manufacturing a hexafluorophosphate according to claim 2, wherein the solvent includes hydrogen fluoride.

7. The method of manufacturing a hexafluorophosphate according to claim 2, wherein an organic solvent is used as the solvent.

8. The method of manufacturing a hexafluorophosphate according to claim 7, wherein the organic solvent is at least either a non-aqueous organic solvent or a non-aqueous ionic liquid.

9. The method of manufacturing a hexafluorophosphate according to claim 2, wherein a solvent having the moisture content of 100 ppmw or less is used as the solvent.

* * * * *